United States Patent [19]
Goeders

[11] 3,837,646
[45] Sept. 24, 1974

[54] PITCHING RUBBER
[75] Inventor: John J. Goeders, Altoona, Iowa
[73] Assignee: True Pitch, Inc., Altoona, Iowa
[22] Filed: Jan. 12, 1973
[21] Appl. No.: 323,240

[52] U.S. Cl. ................................................. 273/25
[51] Int. Cl............................................. A63b 71/00
[58] Field of Search............................. 273/25, 102

[56] References Cited
UNITED STATES PATENTS
| | | | |
|---|---|---|---|
| 3,479,028 | 11/1969 | Goeders | 273/25 |
| 3,508,747 | 4/1970 | Orsatti | 273/25 |

FOREIGN PATENTS OR APPLICATIONS
| | | | |
|---|---|---|---|
| 494,548 | 10/1938 | Great Britain | 273/102 |

Primary Examiner—Richard C. Pinkham
Assistant Examiner—Theatrice Brown
Attorney, Agent, or Firm—Zarley, McKee & Thomte

[57] ABSTRACT

A pitching rubber for a portable pitching mound having a depression or toe hole formed in the upper surface thereof. The pitching rubber comprises a vertically adjustable rear rubber portion constructed of conventional slightly resilient material and a front rubber portion constructed of sponge or foam rubber material. The front rubber portion is positioned adjacent the forward vertical face of the back rubber portion to shield the same from a hit baseball. The two rubber portions fill the depression and have their upper surfaces normally coplanar with the upper surface of the mount. The front rubber portion is impervious to water to prevent the toe hole from filling with water.

8 Claims, 3 Drawing Figures

PATENTED SEP 24 1974 3,837,646

PITCHING RUBBER

BACKGROUND OF THE INVENTION

This invention relates to a pitching rubber and more particularly to a pitching rubber for a portable pitching mound. While the pitching rubber of certain prior art patents is generally satisfactory, it has been found to have two shortcomings. The first shortcoming in the pitching rubber is that the pitching rubber is not vertically adjustable. The vertical forward face of the pitching rubber in some prior art devices is exposed and is frequently struck by a hit baseball which causes the baseball to bounce in an eratic and sometimes dangerous manner. Perhaps still a further shortcoming of the pitching rubber of these prior art devices is that sufficient cushioning is not provided for the pitcher's foot (that foot which is placed on the pitching rubber) as he delivers the ball.

Therefore, it is a principal object of the invention to provide an improved pitching rubber.

A further object of the invention is to provide a pitching rubber for a portable pitching mound.

A further object of the invention is to provide a pitching rubber for a portable pitching mound having means associated therewith for shielding the front vertical face of the pitching rubber.

A further object of the invention is to provide a pitching rubber for a portable pitching mound wherein rear and front rubber portions comprise the pitching rubber.

A further object of the invention is to provide a pitching rubber for a portable mound including means to prevent water from filling the toe hole.

A further object of the invention is to provide a pitching rubber which is vertically adjustable.

A further object of the invention is to provide a pitching rubber for a portable pitching mound which provides proper cushioning to the pitcher's foot.

A further object of the invention is to provide a pitching rubber for a portable pitching mound which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
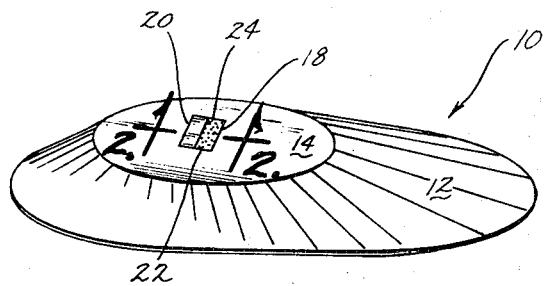
FIG. 1 is a perspective view of a portable pitching mound having the pitching rubber of this invention mounted thereon.

The numeral 10 refers generally to a portable pitching mound such as disclosed in U.S. Pat. No. 3,479,028. Mound is comprised of a hollow molded Fiberglas body 12. The upper portion of the body 12 is provided with a substantially flat area 14 having a rectangular depression 16 formed therein. Depression 16 is defined by vertically disposed front and rear walls 18 and 20, vertically disposed side walls 22 and 24, and bottom 26.

Figure 2:
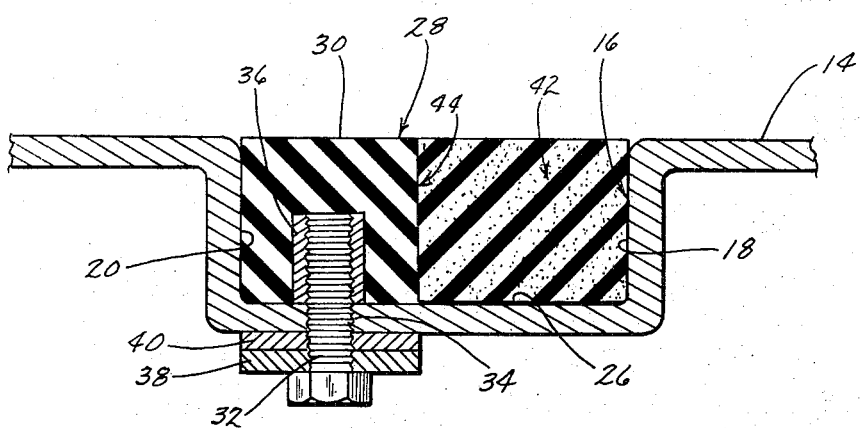
FIG. 2 is an enlarged sectional view seen along lines 2—2 of FIG. 1.
Figure 3:
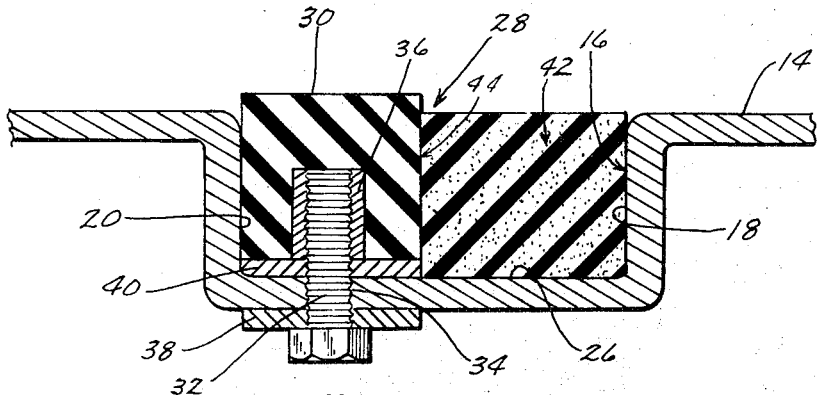
FIG. 3 is a sectional view similar to FIG. 2 except that the pitching plate has been vertically adjusted.

The numeral 28 generally designates a hard conventional pitching rubber positioned in the depression 16 as seen in FIG. 2. Rubber 28 has a height substantially equal to the depth of the depression 16 so that its upper surface 30 will be substantially coplanar with the flat area 14. Plate 28 is secured to the body 12 by a plurality of bolts 32 extending upwardly through openings 34 formed in the bottom 26 as seen in FIG. 2. Suitable threaded fasteners 36 are embedded in rubber 28 for threadable connection to the bolts 32. A pair of shims 38 and 40 are normally positioned on each of the bolts 32 as illustrated in FIG. 2. However, if the upper surface of plate 28 becomes excessively worn or if it is desired to raise the rubber 28, one or more of the shims may be selectively positioned beneath the rubber 28 as seen in FIG. 3 to raise the rubber.

The forward portion of the depression 16 may be termed a toe hole and is filled with a soft sponge rubber member 42. Member 42 is secured to the depression 16 by glue or the like. Member 42 is treated in conventional fashion to make it impervious to water to prevent water from accumulating in the toe hole. The purpose of the member 42 is to shield the forward vertical face of the rubber 28 so as to either prevent or to minimize the possibility of a hit baseball striking the face 44. A further purpose of the member 42 is to provide suitable cushioning for the pitcher's toe or foot as he delivers the ball.

Thus it can be seen that the invention accomplishes at least all of its stated objectives.

I claim:

1. A portable pitching mound comprising,
a pitcher's mound body member of molded Fiberglas plastic material in the form of a convex shaped shell,
the upper portion of said body member provided with a substantially flat area generally circular in shape and of sufficient area to allow a pitcher to comfortably maneuver thereon,
said upper portion having a depression formed therein,
a pitching plate positioned in and filling said depression and having a vertical forward face,
and a resilient member positioned in said depression adjacent the forward face of said plate, and in abutting relationship thereto, to shield the same from a baseball which has been hit.

2. The mound of claim 1 wherein said plate is also comprised of a resilient material, said resilient member being comprised of a material which is substantially more resilient than said plate.

3. The mound of claim 1 wherein said depression is substantially rectangular in shape, said plate and resilient member cooperating to substantially fill said rectangular depression.

4. The mound of claim 3 wherein said resilient member is impervious to water to prevent said depression from filling with water.

5. The mound of claim 3 wherein said resilient member is glued to said body member.

6. The mound of claim 3 wherein said plate is selectively vertically adjustably mounted in said depression.

7. The mound of claim 3 wherein said plate and resilient member have upper surfaces substantially coplanar with the upper surface of said body member.

8. The portable pitching mound of claim 1 wherein said body member has a bottom wall portion beneath said depression, a plurality of bolts extending upwardly through said bottom wall and being threadably received by said pitcher's rubber, said bolts having their heads positioned beneath said bottom wall, and at least one shim member normally on each of said bolts between the head portion thereof and said bottom wall, said shim members being removable from said bolts to permit their installation between said bottom wall and the bottom of said rubber to selectively raise said rubber.

* * * * *